Jan. 23, 1945.  W. MARSELUS  2,367,794
FILTER
Filed Sept. 15, 1941

INVENTOR.
William Marselus
BY Mann, Brown & Cox
Attys.

Patented Jan. 23, 1945

2,367,794

UNITED STATES PATENT OFFICE 2,367,794

FILTER

William Marselus, Sandwich, Ill.

Application September 15, 1941, Serial No. 410,812

5 Claims. (Cl. 210—159)

The principal object of the present invention is to provide a simple, inexpensive filter for use in a funnel or the like and which efficiency filters out solids from liquids passed through the funnel. It is a further object that the device be easy to clean and to handle, and readily adaptable for replacements of filters.

Figure 1:
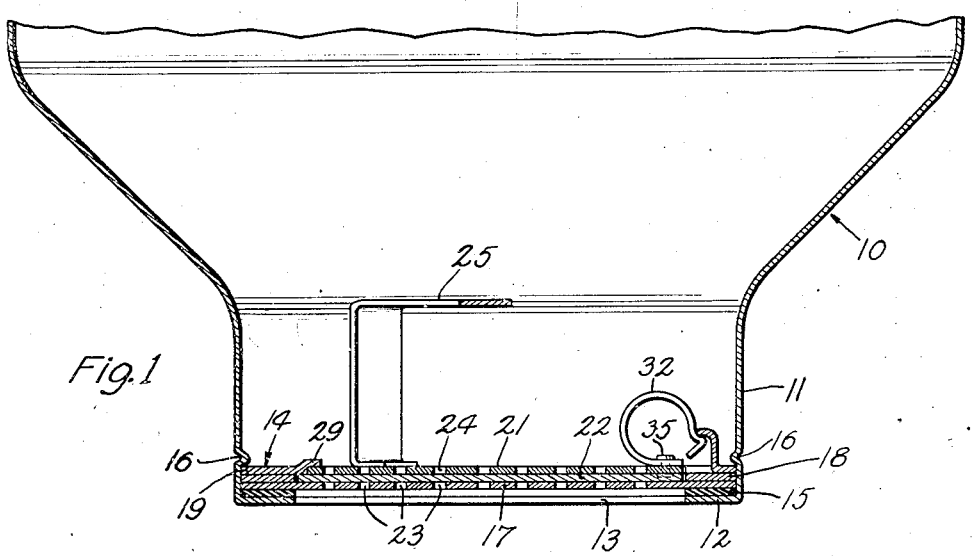
Figure 2:
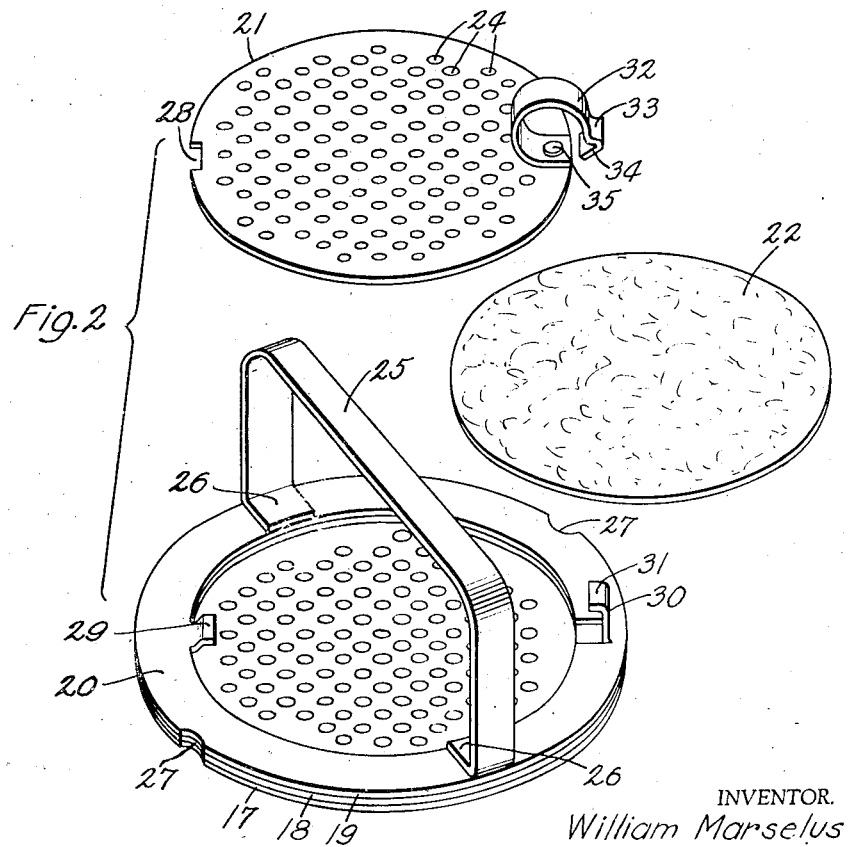

Other objects and advantages will become apparent from the following description and drawing, in which Fig. 1 is a fragmentary, vertical, sectional view through the lower part of a funnel showing the filter unit in place for use; and Fig. 2 is a perspective view of the filter unit showing the filter and cover removed.

For the purpose of illustration in compliance with section 4888 of the Revised Statutes, a specific embodiment of the present invention has been selected. Obviously, many modifications may be made without departing from the scope of the invention.

Referring to Fig. 1, the invention is shown as applied to a funnel generally indicated at 10 having a lower portion 11 with a smaller diameter than the upper portion. The lower edge of the funnel is provided with an inturned flange 12 entirely surrounding the lower opened end 13 of the funnel. The filter unit is generally indicated at 14 in Fig. 1, and is shown mounted in place on the peripheral flange 12 surrounding the funnel opening 13, and a suitable rubber or fiber gasket 15 is inserted between the filter unit 14 and the peripheral flange 12. Some means for holding the filter unit 14 in place must be provided, and for the purpose of illustration the side walls of the lower portion 11 of the funnel are provided with impressed lugs 16 on diametrically opposite sides of the funnel. As shown in Fig. 1, these lugs 16 overlap the upper face of the filter unit 14 in such a manner as to hold the filter unit in place and to produce a downward force on the filter unit against the gasket 15 to maintain a seal between the filter unit and the peripheral flange 12. In this manner, passage of dirt and other solid particles around the filter unit is prevented.

The filter unit 14 comprises a bottom plate 17, an intermediate ring 18, and an upper plate 19, the latter of which is made up of a shoulder or ring portion 20 and a removable central portion or cover 21. The outer diameters of all of these members making up the filter unit are approximately the same, as best shown in Fig. 2, and they are mounted concentrically one on top of the other and fastened together into a unitary member. The filter unit further includes a filter member 22 of some fabric or other suitable material for filtering purposes, and its diameter corresponds approximately with the inner diameter of the intermediate ring 18. This filter member 22 is adapted to rest on the upper face of the bottom plate 17, and the cover 21 when closed, as shown in Fig. 1, holds this filter in place.

The lower plate 17 is perforated at 23 throughout the area surrounded by the intermediate ring 18. Likewise, the cover 21 forming part of the top plate is perforated throughout its area as shown at 24. The cover 21 is removable as shown, or it may be hinged to the ring portion 20 of the top plate 19 so as to provide access into the area surrounded by the intermediate ring 18 for cleaning purposes and for replacement of the filter member 22. As shown in Fig. 2, a suitable handle 25 is secured to the upper plate 19 by means of inturned flanges 26 fastened to the ring portion 20 of the upper plate. This handle 25 extends upwardly so that when removing the filter unit 14 access to the handle 25 may be had through the top of the funnel 10. Suitable notches 27 are provided in the outer edges of the bottom and top plates 17 and 19, respectively, and the intermediate ring 18 and are suitably placed and are of sufficient size to permit the filter unit 14 to clear the lugs 16 when the filter unit is properly turned and raised upwardly through the narrow portion 11 of the funnel.

As shown, the cover 21 is notched at 28 sufficiently to clear a projection 29 extending inwardly on the ring portion 20 of the upper plate 19. This projection 29 is so arranged that when the cover 21 is in place the projection engages the upper face of the cover as best shown in Fig. 1.

On the diametrically opposite side of the ring 20 is an upwardly extending stop 30 having an inwardly extending flange 31. A spring catch member 32 is secured to the upper plate 19 of the filter unit 14 by means of a rivet 35 or other suitable fastening member, and this spring catch projects beyond the periphery of the cover and is provided with an offset portion 33 terminating in a downwardly extending flange 34. When the cover 21 is in place, as shown in Fig. 1, the spring catch member 32 engages the underneath face of the horizontal flange 31 of the stop 30, and this spring catch acting against the stop, together with the flange member 29 at the opposite side of the cover 21, holds the cover in place.

The filter unit forming the subject matter of the present invention is a simple unitary device made up of a minimum number of parts which are so organized and arranged that they can be cleaned easily and thoroughly. The filter member 22 can be removed simply by grasping the spring catch 32 with the finger and then applying an upward force. The resiliency of the spring catch 32 causes the free end to bend inwardly, thereby permitting the spring catch 32 to clear the stop 30 so that the cover 21 of the filter unit 14 can be raised. During this portion of the operation, the cover pivots slightly about its edge disposed underneath the projection 29 on the ring 20, and when the cover has been raised sufficiently to clear the stop it is withdrawn from beneath the projection 29. In this manner, the cover is removed from the filter unit 14 and the filter member 22 can be replaced. The cover 21 is returned to its normal position by first inserting the notched portion 28 beneath the projection 29 of the ring 20, and then the cover is snapped into place.

Obviously, the cover 21 may be hinged directly to the ring 20 of the top plate 19. Suitable means other than the spring catch 32 may be employed for fastening the cover in place.

One of the important characteristics of the present device is that it is a unit and is simple to clean, since all parts are accessible. This can best be accomplished by having the cover 21 removable in some suitable manner as illustrated in the drawing.

The filter unit forming the subject matter of the present invention is very well suited for use in filtering milk. The importance of cleanliness in equipment used for this purpose is obvious.

It is to be noted that the filter member 22 when in place in the filter unit 14 projects beyond the outer circle of perforations 23. This is best shown in Fig. 1 and serves the purpose of preventing solid particles from passing around the filter and through the perforations 23 in the lower plate. Thus, it is seen that all liquids passing through the filter unit necessarily must pass through the fibrous material of the filter unit 22. It is also seen that the gasket 15 between the filter unit 14 and the peripheral flange 12 at the bottom of funnel 10 forms a seal between the filter unit and the opening 13 in the bottom of the funnel. In this manner, liquid is prevented from by-passing the filter unit.

The filter unit may be made of some suitable metal, such as aluminum or stainless steel, or, if desired, it may be molded in a suitable plastic.

A second spring catch member 32 with its corresponding catch or stop 30 may be located at the diametrically opposite side of the cover from the one shown, so that, instead of hooking the cover under the lip or projection 29, the cover may be snapped in place on two of its sides. It may be found desirable to provide a raised portion on the top of the filter unit 14 at positions corresponding to the locations of the lugs 16, and these raised portions can fit directly under the lugs so as to provide a tighter fit for the filter unit in the bottom of the funnel. These raised portions may have inclined surfaces so that the filter unit can be first lowered into place and then rotated in such a manner that the inclined surfaces are moved underneath the lugs 16, thereby wedging the filter unit 14 in place.

I claim:

1. A filter unit comprising a bottom perforated plate, a top plate including an outer ring and a removable central portion, the removable portion being perforated, the said two plates being fastened together with the outer ring portion of the top plate and the margin of the upper face of the bottom plate being sealed together and the central removable portion of the top plate being parallel to and spaced from the bottom plate, a filter member adapted to rest on the bottom plate in the area surrounded by the outer ring of the top plate, and means for removably fastening the central removable top plate portion in place within the outer ring of the top plate and over the filter.

2. A filter unit comprising a bottom plate perforated throughout its central portion, a top plate over the bottom plate and including an outer peripheral ring having an outer diameter corresponding substantially to the diameter of the bottom plate and a central portion removably attached to the peripheral ring and disposed parallel to and spaced from the bottom plate, the central removable portion being perforated, and a filter member removably mounted on the bottom plate over the central perforated portion and adapted to fill the area surrounded by the peripheral ring of the top plate, the removable central portion of the top plate being adapted to hold the filter member in place.

3. A filter unit for use in a funnel and removable from the funnel as a unit comprising a bottom plate separate from the funnel, a top plate hinged to the bottom plate, a passage through the top and bottom plates, a removable filter member between the top and bottom plates and covering the passage and adapted to filter out solid particles from liquids passed through the filter member, and locking means independent of the funnel for holding the top and bottom plates together with the filter member held firmly therebetween, the entire unit being self supporting and being adapted for assembly away from the funnel and supported as a unit by the funnel.

4. A filter unit for use in a funnel comprising a pair of relatively flat supporting members having perforations therethrough and hingedly mounted with respect to each other, a removable filter member disposed between the two supporting members and covering the perforations, the supporting members independently of the funnel being adapted to hold firmly the filter over the perforations, and means for locking together the supporting members with the filter member held firmly therebetween, the entire unit being self supporting and being adapted for assembly away from the funnel and supported as a unit by the funnel.

5. A filter unit for use in a funnel comprising a pair of separate, relatively flat supporting members having passages therethrough and being adapted to fit one on top of the other with a space therebetween, a removable filter member removably disposed in the space between the two supporting members and over the said passages so as to filter out solids from liquids passing through the unit, and means independent of the funnel for locking the supporting members together to hold firmly the filter member in place over the passages.

WILLIAM MARSELUS.